US011678419B2

(12) United States Patent
Pahlevaninezhad et al.

(10) Patent No.: US 11,678,419 B2
(45) Date of Patent: Jun. 13, 2023

(54) APPARATUS AND METHODS FOR HIGH POWER LED LIGHTS

(71) Applicant: 10644137 CANADA INC., Calgary (CA)

(72) Inventors: Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 17/260,214

(22) PCT Filed: Jul. 15, 2019

(86) PCT No.: PCT/CA2019/050973
§ 371 (c)(1),
(2) Date: Jan. 13, 2021

(87) PCT Pub. No.: WO2020/010472
PCT Pub. Date: Jan. 16, 2020

(65) Prior Publication Data
US 2021/0298152 A1    Sep. 23, 2021

Related U.S. Application Data

(60) Provisional application No. 62/697,542, filed on Jul. 13, 2018.

(51) Int. Cl.
*H05B 33/02* (2006.01)
*H05B 45/46* (2020.01)
(Continued)

(52) U.S. Cl.
CPC ............ *H05B 45/46* (2020.01); *H05B 45/32* (2020.01); *H05B 45/355* (2020.01); *H05B 47/11* (2020.01); *H05B 47/115* (2020.01)

(58) Field of Classification Search
CPC ...... H05B 45/46; H05B 45/355; H05B 45/32; H05B 45/39; H05B 45/382; H05B 47/11; H05B 47/115
See application file for complete search history.

(56) References Cited

U.S. PATENT DOCUMENTS

| | | | |
|---|---|---|---|
| 6,369,525 B1 * | 4/2002 | Chang | H05B 45/385 |
| | | | 315/300 |
| 6,504,267 B1 * | 1/2003 | Giannopoulos | H02M 3/33561 |
| | | | 307/31 |

(Continued)

FOREIGN PATENT DOCUMENTS

WO    WO-2017060813 A1 *    4/2017    ........... H05B 45/382

OTHER PUBLICATIONS

International Search Report and Written Opinion dated Sep. 16, 2019 for PCT Application PCT/CA2019/050973 filed on Jul. 15, 2019.

*Primary Examiner* — Kurtis R Bahr
(74) *Attorney, Agent, or Firm* — Chamberlain, Hrdlicka, White, Williams & Aughtry

(57) ABSTRACT

A Light-Emitting Diode (LED) light system has a plurality of LED groups connected in parallel with each of the plurality of LED groups having one or more LEDs connected in series, a power circuit having a plurality of outputs with each output of the power circuit is electrically coupled to a respective one of the plurality of LED groups, and a control subsystem electrically coupled to the power circuit for individually controlling each output of the power circuit for controlling the operation of the corresponding LED group and adapting to the characteristics thereof. In some embodiments, at least one LED group may further have a switch and/or a light-angle controlling structure connected with the one or more LEDs in series and controlled by the (Continued)

control subsystem for selectively enabling or disabling the LED group and/or adjusting the light angle thereof.

34 Claims, 7 Drawing Sheets

(51) Int. Cl.
*H05B 47/115* (2020.01)
*H05B 47/11* (2020.01)
*H05B 45/355* (2020.01)
*H05B 45/32* (2020.01)

(56) References Cited

U.S. PATENT DOCUMENTS

| | | | |
|---|---|---|---|
| 6,888,529 B2* | 5/2005 | Bruning | H05B 45/385 |
| | | | 345/82 |
| 6,937,378 B2 | 8/2005 | Yamazaki et al. | |
| 7,109,667 B2* | 9/2006 | Matsushima | H05B 41/2827 |
| | | | 315/226 |
| 8,183,795 B2* | 5/2012 | Huang | H05B 45/382 |
| | | | 315/300 |
| 10,093,224 B2 | 10/2018 | Kim et al. | |
| 10,902,800 B2* | 1/2021 | Wu | G09G 5/30 |
| 2004/0052076 A1* | 3/2004 | Mueller | G02B 27/0994 |
| | | | 362/293 |
| 2007/0159421 A1* | 7/2007 | Peker | H05B 45/3725 |
| | | | 345/82 |
| 2014/0098540 A1 | 4/2014 | Krauss | |
| 2017/0138571 A1 | 5/2017 | Chen | |

* cited by examiner

APPARATUS AND METHODS FOR HIGH POWER LED LIGHTS

CROSS-REFERENCE TO RELATED APPLICATIONS

This application claims the benefit of U.S. Provisional Patent Application Ser. No. 62/697,542, filed Jul. 13, 2018, the content of which is incorporated herein by reference in its entirety.

FIELD OF THE DISCLOSURE

The present disclosure relates to lighting solutions using Light-Emitting Diode (LED) lights, and in particular to apparatus, method, and system for high-power LED lights.

BACKGROUND

Light-Emitting Diodes (LEDs) are known and have been widely used in industries such as for lighting solutions and as low-power light indicators. In recent years, LEDs with increased power output or increased luminous intensity have been developed and used for illumination. For example, with improved energy efficiency, safety, and reliability, LED lights are replacing other types of lights in the market such as incandescent lights, compact fluorescent lamps (CFLs), and the like. As everyday lighting significantly contributes to the burden on power grids and greatly increases the overall requirements for electricity generation, energy-efficient LEDs will play a crucial role in future energy savings. It is likely that LEDs will dominate the lighting markets because of their superior energy efficiency.

Lighting solutions for highways and warehouses are important applications requiring high-luminous intensities. Lighting these areas usually requires much higher power compared to other applications such as residential lighting applications. With the advantages such as higher efficiency, high-light intensity, and the like, LEDs with increased power output and/or increased luminous intensity have become promising candidates for highway and warehouse lighting solutions.

FIG. 1 shows a typical configuration of a prior-art high-power LED light 10. As shown, the LED light 10 comprises a plurality of strings 16 of LEDs 18 connected in parallel and an alternate-current to direct-current (AC/DC) converter 14 for converting the alternate current (AC) from an AC power source 12 such as an AC grid to direct current (DC) for powering all strings 16 of LEDs 18. However, such a prior-art high-power LED light 10 may have low power efficiency for the following reasons.

LED characteristics are usually sensitive to deviations in the voltage or the current. FIG. 2A shows the current-voltage (I-V) characteristics of a typical LED where the current is represented using the symbol i and the voltage is represented using the symbol v. It is clear that a small deviation in the voltage or the current may result in significantly different characteristics such as a significantly different equivalent impedance.

LEDs generally have different characteristics and it is difficult or even impossible to ensure all LEDs 18 of the prior-art high-power LED light 10 to have the same characteristics. Referring back to FIG. 1, since the LED strings 16 are connected in parallel, all LED strings 16 are driven by the same voltage. However, as the LEDs 18 of each string 16 may have different characteristics, there may be voltage/current deviations on the LEDs 18 thereof, thereby causing the LEDs 18 operating in un-optimized conditions and resulting in low power-efficiency. Another issue of the prior-art high-power LED light 10 is the detrimental impacts of un-optimized operation conditions to the life-time of the LEDs 18. For example, operating at high-impedance regions causes thermal stress on LEDs 18 and shortens their life-time.

As shown in FIG. 2B, a LED 18 has a fixed angular span of light. However, different types of LEDs may have different characteristics such as different light angular-spans, different efficacies, and/or the like. Therefore, based on the application, a specific type of LED has to be selected to provide similar characteristics such as a similar or desired light angular-span. Such a selection requirement usually causes significant burdens to the manufacturing as manufacturers have to make different designs for different applications and cannot use a universal solution. An LED light with the capability to change its light angular-span would greatly facilitate the manufacturing of high-power LED lights.

SUMMARY

According to one aspect of this disclosure, there is disclosed a Light-Emitting Diode (LED) light system comprising: a plurality of LED groups connected in parallel, each of the plurality of LED groups comprising one or more LEDs connected in series; a power circuit comprising a plurality of outputs, each output electrically coupled to a corresponding one of the plurality of LED groups for individually powering the corresponding LED group; and a control subsystem electrically coupled to the power circuit for individually controlling each output of the power circuit for adaptively controlling an operation of the corresponding LED group coupled to said output.

In some embodiments, the control subsystem is configured for individually controlling each output of the power circuit for controlling the operation of the corresponding LED group coupled to said output for adapting to one or more characteristics thereof.

In some embodiments, each of the plurality of LED groups comprises a same number of LEDs.

In some embodiments, at least two of the plurality of LED groups comprise different numbers of LEDs.

In some embodiments, at least a first one of the plurality of LED groups further comprises a switch electrically coupled to the one or more LEDs in series; and the control subsystem is electrically coupled to the switch for selectively enabling or disabling said at least the first one of the plurality of LED groups.

In some embodiments, at least a second one of the plurality of LED groups further comprises a light-angle controlling structure; and the control subsystem is electrically coupled to the light-angle controlling structure for adjusting at least one of a light angle and a light angular-span of said at least the second one of the plurality of LED groups.

In some embodiments, said at least the second one of the plurality of LED groups further comprises a base structure controllable by the light-angle controlling structure thereof for rotating about one or more axes thereof for adjusting the light angle thereof.

In some embodiments, said at least the second one of the plurality of LED groups further comprises one or more sub-platforms each comprising a subset of the LEDs of the LED group; and each of the one or more sub-platforms is controllable by the light-angle controlling structure thereof for rotating about one or more axes thereof for adjusting the light angular-span thereof.

In some embodiments, at least one of the LEDs is rotatably coupled to a microelectromechanical-structure (MEMS) component thereby forming a LED assembly for adjusting light-emission angle hereof under the control of the MEMS component.

In some embodiments, the plurality of LED groups comprise a plurality of LED assemblies printed onto the base.

In some embodiments, the LED light system further comprises a communication subsystem. The control subsystem is coupled to the communication subsystem for receiving and transmitting instructions for controlling the operation of the plurality of LED groups.

In some embodiments, the LED light system further comprises a motion sensor. The control subsystem is coupled to the motion sensor for receiving sensor data therefrom for controlling the operation of the plurality of LED groups.

In some embodiments, the LED light system further comprises a light sensor. The control subsystem is coupled to the light sensor for receiving sensor data therefrom for controlling the operation of the plurality of LED groups.

In some embodiments, the power circuit comprises a transformer having an input on a primary side thereof for receiving electrical power and a plurality of outputs on a secondary side thereof for individually powering the plurality of LED groups.

In some embodiments, the control subsystem comprises a voltage circuit, a first current-control circuit, and a pulse-code modulation (PCM) modulator for controlling a circuitry on the primary side of the transformer for power-factor correction.

In some embodiments, the control subsystem comprises a phase-shift modulator and a plurality of second current-control circuits for controlling a circuitry on the secondary side of the transformer for regulating currents of the plurality of LED groups.

In some embodiments, the control subsystem is configured for controlling the circuitry on the secondary side of the transformer for regulating the currents of the plurality of LED groups based at least on an output of the PCM modulator and output currents of the plurality of outputs on the secondary side of the transformer.

In some embodiments, the control subsystem is configured for controlling the circuitry on the secondary side of the transformer for regulating the currents of the plurality of LED groups based further on an output of the communication subsystem.

In some embodiments, the control subsystem is further configured for providing a phase-shift between voltage waveforms at the primary side of the transformer and voltage waveforms at the secondary side thereof.

According to one aspect of this disclosure, there is disclosed a method for controlling a plurality of LEDs for lighting. The method comprises: partitioning the plurality of LEDs into a plurality of LED groups connected in parallel, each of the plurality of LED groups comprising one or more of the plurality of LEDs connected in series; individually powering each of the plurality of LED groups; and individually controlling the powering of each LED group for adaptively controlling an operation of the LED group.

In some embodiments, said individually controlling the powering of each LED group comprises: individually controlling the powering of each LED group for controlling the operation of the LED group for adapting to one or more characteristics thereof.

In some embodiments, each of the plurality of LED groups comprises a same number of LEDs.

In some embodiments, at least two of the plurality of LED groups comprise different numbers of LEDs.

In some embodiments, said individually controlling the powering of each LED group further comprises: using a switch for selectively enabling or disabling at least a first one of the plurality of LED groups.

In some embodiments, said individually controlling the powering of each LED group further comprises: adjusting at least one of a light angle and a light angular-span of at least a second one of the plurality of LED groups.

In some embodiments, said second LED group further comprises a base structure; and said adjusting the at least one of the light angle and the light angular-span of the at least the second one of the plurality of LED groups comprises: rotating the base structure about one or more axes thereof for adjusting the light angle thereof.

In some embodiments, said at least the second one of the plurality of LED groups further comprises one or more sub-platforms each comprising a subset of the LEDs of the LED group; said second LED group further comprises a base structure; and said adjusting the at least one of the light angle and the light angular-span of the at least the second one of the plurality of LED groups comprises: rotating each of the one or more sub-platforms about one or more axes thereof for adjusting the light angular-span thereof.

In some embodiments, the method further comprises: receiving and transmitting instructions via a communication subsystem for controlling the operation of the plurality of LED groups.

In some embodiments, the method further comprises: detecting motion about the plurality of LED groups; and controlling the operation of the plurality of LED groups based on the motion-detection.

In some embodiments, the method further comprises: sensing light about the plurality of LED groups; and controlling the operation of the plurality of LED groups based on the light-sensing.

In some embodiments, said individually powering each of the plurality of LED groups comprises: using a transformer for receiving electrical power at a primary side thereof and individually powering the plurality of LED groups from a plurality of outputs on a secondary side thereof.

In some embodiments, said individually controlling the powering of each LED group comprises: using a voltage circuit, a first current-control circuit, and a pulse-code modulation (PCM) modulator for controlling a circuitry on the primary side of the transformer for power-factor correction.

In some embodiments, said individually controlling the powering of each LED group comprises: using a phase-shift modulator and a plurality of second current-control circuits for controlling a circuitry on the secondary side of the transformer for regulating currents of the plurality of LED groups.

In some embodiments, said individually controlling the powering of each LED group comprises: controlling the circuitry on the secondary side of the transformer for regulating the currents of the plurality of LED groups based at least on an output of the PCM modulator and output currents of the plurality of outputs on the secondary side of the transformer.

In some embodiments, said individually controlling the powering of each LED group comprises: controlling the circuitry on the secondary side of the transformer for regulating the currents of the plurality of LED groups based further on an output of the communication subsystem.

In some embodiments, said individually controlling the powering of each LED group comprises: providing a phase-shift between voltage waveforms at the primary side of the transformer and voltage waveforms at the secondary side thereof.

BRIEF DESCRIPTION OF THE DRAWINGS

The embodiments of the present disclosure will now be described with reference to the following figures, in which identical reference numerals in different figures indicate identical elements and in which.

DETAILED DESCRIPTION

Figure 1:
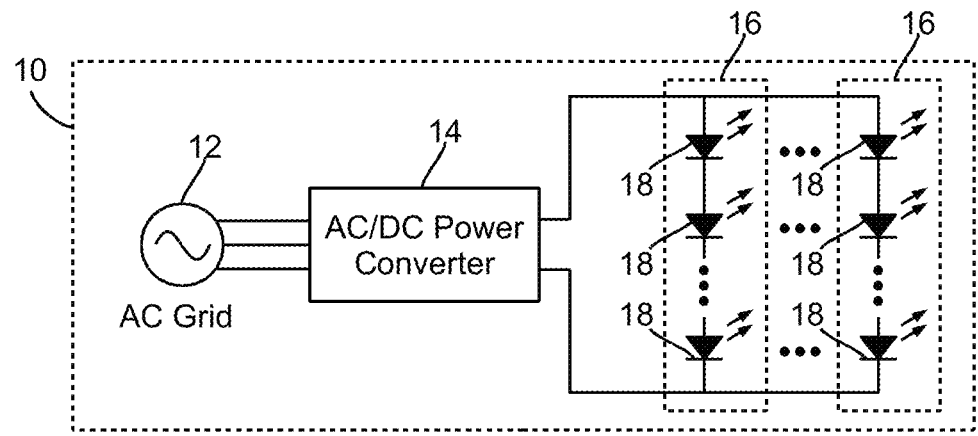
FIG. 1 is a block diagram showing the architecture of a prior-art high-power LED light.
Figure 2A:
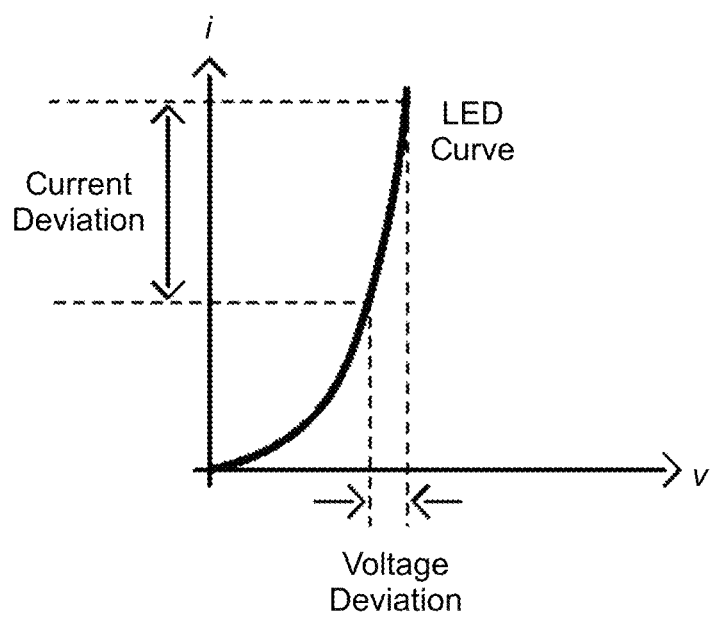
FIG. 2A is a diagram showing the current-voltage characteristics of a typical LED.
Figure 2B:
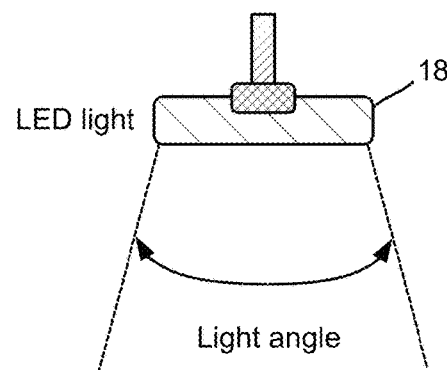
FIG. 2B is a block diagram showing a LED in its light-emission operation.
Figure 3:
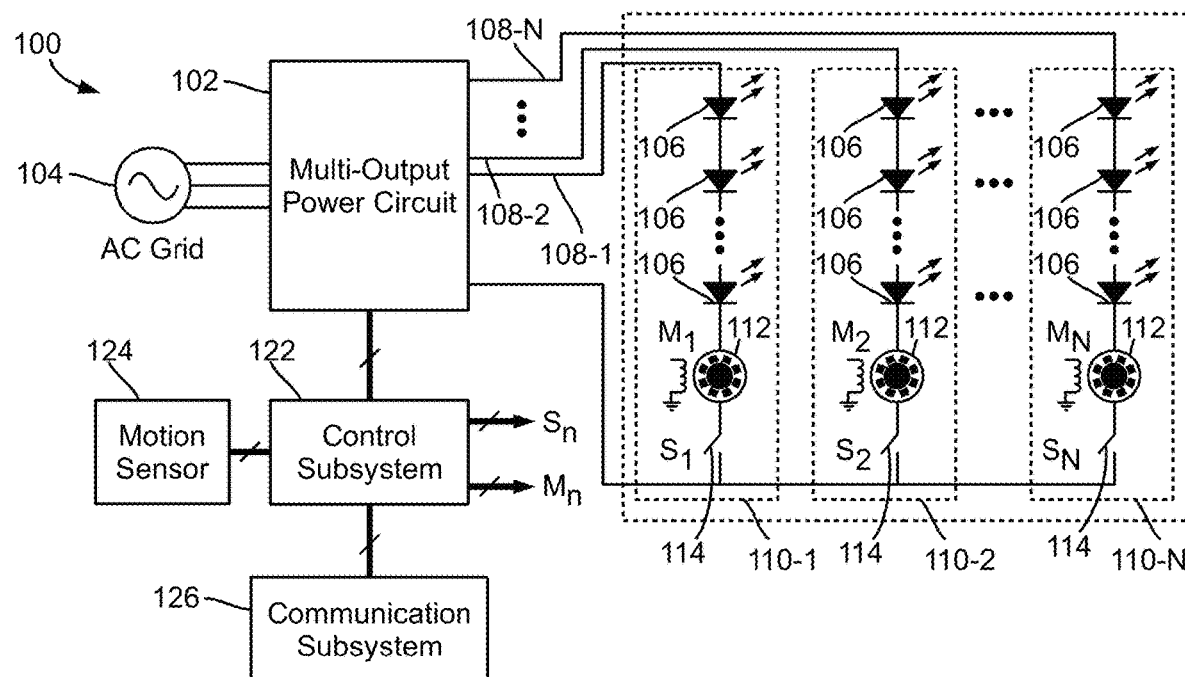
FIG. 3 is a block diagram showing an example of a structure of a LED light system, according to some embodiments of this disclosure, where in the LED light system comprises a plurality of LED groups.

Turning now to FIG. 3, a high-power Light-Emitting Diode (LED) light system is shown and is generally identified using the reference numeral 100. As shown, the LED light system 100 comprises a multi-output power circuit 102 receiving electrical power from an alternate current (AC) power source 104 such as an AC grid and converting the AC power to a direct current (DC) voltage for powering a plurality of LEDs 106. The multi-output power circuit 102 comprises a plurality of DC outputs 108-1, 108-2, . . . , 108-N (collectively denoted using reference numeral 108; and N>1 being an integer). Correspondingly, the LEDs 106 are arranged in to N LED groups 110-1, 110-2, . . . , 110-N (collectively denoted using reference numeral 110), with each LED group 110 connected to a respective DC output 108 of the multi-output power circuit 102.

Each LED group 110 comprises one or more LEDs 106, a light-angle controlling structure 112 (also denoted using the symbol $M_n$, n=1, 2, . . . , N, for the light-angle controlling structure of the n-th LED group), and a switch 114 (also denoted using the symbol $S_n$ for the switch of the n-th LED group), all connected in series. Each switch 114 is configurable between an on or closed condition and an off or open condition for selectively enabling or disabling the corresponding LED group 110.

Figure 4A:
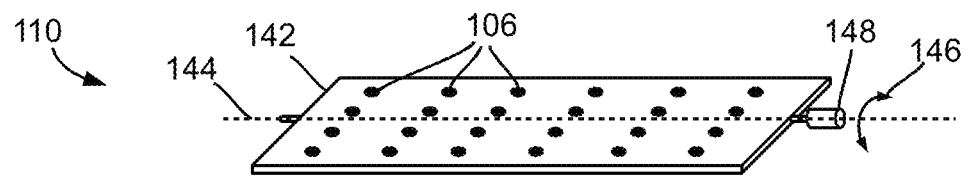
FIG. 4A is a schematic perspective view of a LED group of the LED light system shown in FIG. 3, according to some embodiments of this disclosure, wherein the LED group is controllable under a light-angle controlling structure thereof for adjusting the light angle thereof.

Each light-angle controlling structure 112 is configured for controlling the light angle and/or the light angular-span of the LED group 110. For example, in some embodiments as shown in FIG. 4A, the LEDs 106 of each LED group 110 may be installed, mounted, or otherwise coupled to a base structure 142 (such as a supporting platform) rotatable about one or more axes 144 thereof as indicated by the arrow 146. One or more motors 148 are coupled to the base structure 144 and under the control of the light-angle controlling structure 112 (not shown) for rotating the base structure 142 and the LEDs 106 thereon about the one or more axes 144 for controlling the light angle.

Figure 4B:
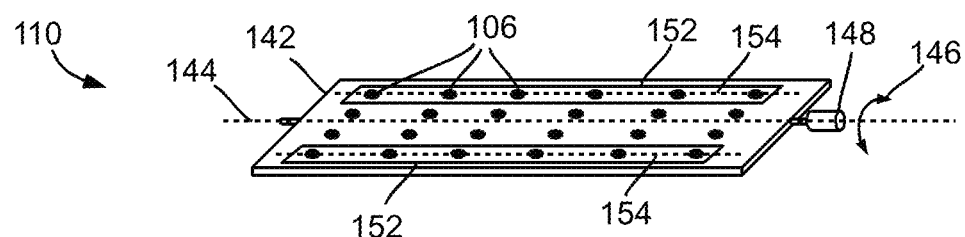
FIG. 4B is a schematic perspective view of a LED group of the LED light system shown in FIG. 3, according to some embodiments of this disclosure, wherein the LED group is controllable under a light-angle controlling structure thereof for adjusting the light angle and the light angular-span thereof.

In some embodiments as shown in FIG. 4B, the base structure 142 may comprise one or more sub-platforms 152 each comprising a subset of the LEDs 106 of the LED group 110 coupled thereon and rotatable under the control of one or more motors (not shown) about one or more axes 154 thereof for adjusting the light angular-span. As shown in FIG. 4B, the light-angle controlling structure 112 in these embodiments may control both the light angle and the light angular-span.

Those skilled in the art will appreciate that in some embodiments similar to that shown in FIG. 4B, the base structure 142 may not be rotatable. Therefore, the light-angle controlling structure 112 in these embodiments may only control the sub-platforms 152 for adjusting the light angular-span.

In the embodiments shown in FIG. 4B, the sub-platforms 152 are rotatably coupled to the base structure 142. In some embodiments, the LED group 110 may not comprise a base structure and each sub-platform 152 is rotatably coupled to a respective support structure.

Figure 4C:
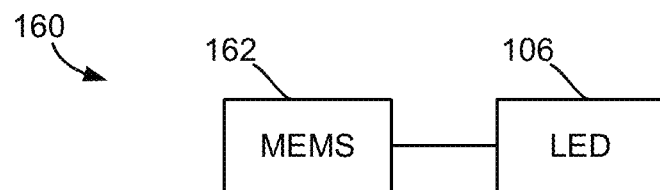
FIG. 4C is a schematic diagram of a LED assembly of the LED light system shown in FIG. 3, according to some embodiments of this disclosure, wherein the LED assembly comprises a LED rotatably coupled to a microelectromechanical-structure (MEMS) component for adjusting the light-emission angle thereof.

In some embodiments, the light direction or light-emission angle of each LED 106 may be individually controlled. For example, as shown in FIG. 4C, a LED assembly 160 may comprise a LED 106 rotatably coupled to a microelectromechanical-structure (MEMS) component 162 such that the MEMS component, in response to suitable electrical signal, controls the light-emission angle of the LED 106 coupled thereto for adjusting the light direction of the LED 106.

Referring back to FIG. 3, the LED groups 110 may each comprise a base structure with one or more LED assemblies 160 installed thereon such that the light angle and the light angular-span of each LED group 110 may be more precisely controlled by the light-angle controlling structure 112 or the control subsystem 122. Each LED group 110 may also comprise one or more LEDs not coupled to or associated with any MEMS components.

As those skilled in the art will appreciate, the base structure may be non-rotatable in some related embodiments, or may be rotatable in some other related embodiments for achieving, e.g., large light-angle adjustment range.

In some embodiments, the LED assemblies 160 may be printed onto the base structure thereby significantly simplifying the manufacturing process.

As shown in FIG. 3, the LED light system 100 also comprises a control subsystem 122 configured for controlling the multi-output power circuit 102, the light-angle controlling structures 112, and the switches 114 for optimizing the operation of LED groups 110. In these embodiments, the control subsystem 122 receives sensor data and instructions from a motion sensor 124 and a communication subsystem 126, respectively, and uses received data to adjust the operation of the LED groups 110. The motion sensor 124 is used for detecting moving objects such as vehicle traffics, pedestrians, and the like, such that the LEDs groups 110 are turn on when moving objects are detected. The communication subsystem 126 is used for receiving LED-group-control instructions from for example a remote control center for controlling the operation of the LED groups 110.

With the data and instructions received from the motion sensor 124 and the communication subsystem 126, the control subsystem 122 may control the multi-output power circuit 102 to turn on the LED groups 110, turn off the LED groups 110, adjust the output voltage and/or current, or the like; the control subsystem 122 may control the light-angle controlling structures 112 to adjust the light angles of corresponding LED groups 110; the control subsystem 122 may also control the switches 114 to enable or disable the corresponding LED groups 110 for adjusting the light intensity of the LED light system 100.

By arranging the LEDs 106 into a plurality of LED groups 110 and by individually powering each LED group 110 with a separate DC output 108, the system 100 may adapt to the different characteristics of the LED groups 110 and optimize the operation of each LED group 110 individually or separately.

For example, each LED group 110 may be tested via a calibration process to determine an optimal impedance region thereof and the corresponding current/voltage. Then, the multi-output power circuit 102 sets the operation current/voltage of each LED group 110 to its determined current/voltage to ensure that the LED group 110 operates in its optimal impedance region.

Therefore, as the current/voltage of each LED group 110 is individually controlled, the discrepancies and tolerances in LED groups 110 may be compensated accordingly. Although the LEDs 106 of a LED group 110 may still have different characteristics such as different voltage/current deviations, the voltage/current applied to the LED group 110 is adapted to "averaged" characteristics of a relatively small number of LEDs 106 compared to the prior-art LED light system using a single output to drive all LEDs in which all LEDs are connected in parallel and a same voltage is applied thereto. Such "averaged" characteristics of a relatively small number of LEDs 106 may exhibit smaller deviations and/or discrepancies than "averaged" characteristics of a large number of LEDs 106 (e.g., all LEDs in prior-art systems). Adapting the outputs of the multi-output power circuit 102 to the respective LED groups 110 may delay the efficiency deterioration of the LEDs 106.

Moreover, one may choose the LEDs 106 such that the LEDs 106 in a same LED group 110 are similar in one or more easily-identifiable properties, e.g., manufactured by a same manufacturer, manufactured in a same batch, and/or the like. Such LEDs 106 may more likely have similar characteristics and the LED group 110 may have reduced deviations and/or discrepancies from its "averaged" characteristics compared to a LED group 110 comprising randomly selected LEDs 106.

Those skilled in the art will appreciate that a tradeoff may be made between the optimization of LED lighting operation and the system cost. For example, for a given number of LEDs 106, the LED light system 100 in some embodiments may comprise a larger number of LED groups 110 with each LED group comprising a smaller number of LEDs 106 to achieve a better-optimized LED lighting operation but with higher cost (due to a larger number of DC outputs and more wiring required). In some other embodiments, the LED light system 100 may comprise a smaller number of LED groups 110 with each LED group comprising a larger number of LEDs 106 to achieve a lower cost (because of a smaller number of DC outputs and less wiring required) but a less-optimized LED lighting operation.

In some embodiments, the LEDs 106 of each LED group 110 may be selected to have similar characteristics while the LEDs 106 of different LED groups 110 may have different characteristics. Compared to the prior-art system that requires all LEDs to have similar characteristics, the LED light system 100 in these embodiments imposes less burden to the manufacturing.

Those skilled in the art will appreciate that in some embodiments, different LED groups 110 may have different numbers of LEDs as needed and/or for achieving an optimized balance between LED lighting operation and cost.

Figure 5:
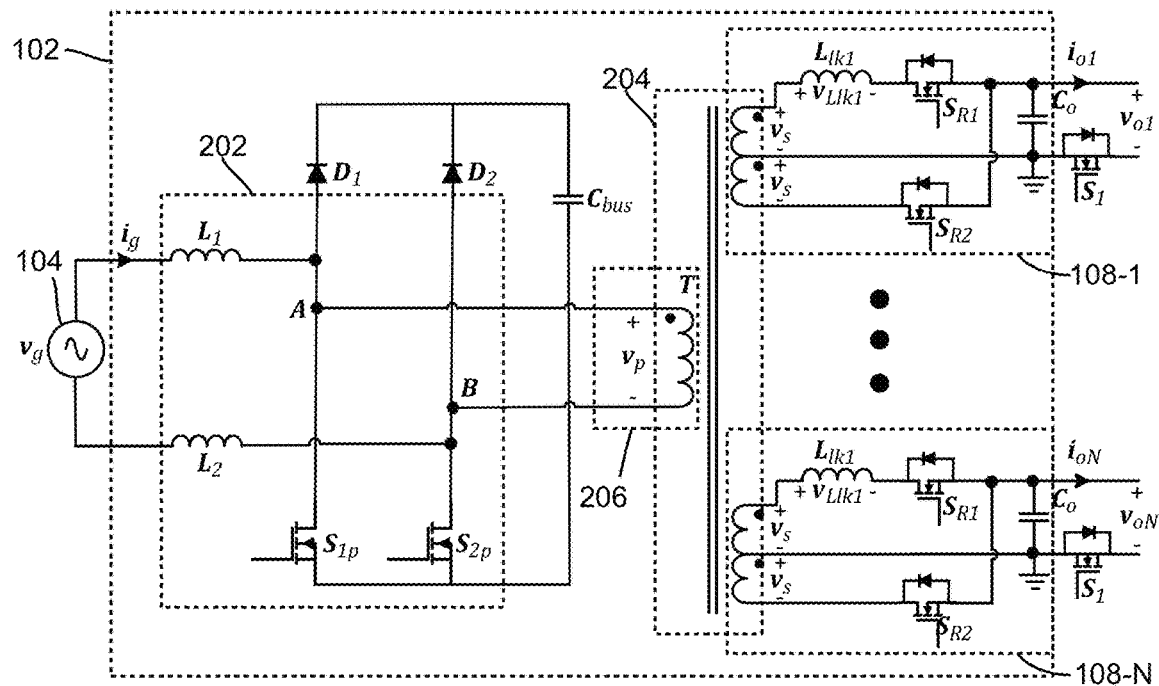
FIG. 5 is a circuit diagram showing the multi-output power circuit of the LED light system shown in FIG. 3 implemented using a non-resonant power circuit, according to some embodiments of this disclosure.

FIG. 5 is a circuit diagram showing the multi-output power circuit 102 implemented using a non-resonant power circuit in some embodiments. As shown, the power circuit 102 provides multiple outputs 108-1 to 108-N for individually powering the LED groups 110. The power circuit 102 also comprises a power-factor correction (PFC) circuit 202 at the AC side implemented using the inductors $L_1$ and $L_2$ and the switches $S_{1p}$ and $S_{2p}$ (implemented using metal-oxide-semiconductor field-effect transistors (MOSFETs)) such that the current drained from the AC grid 104 is nearly sinusoidal and in phase with the grid voltage.

The multi-output power circuit 102 comprises a transformer 204 having a single input 206 at the primary side thereof and a plurality of outputs 108-1 to 108-N with output voltages $v_{o1}$ to $v_{oN}$ at the secondary side thereof. The transformer 204 receives the output of the PFC circuit 202 at its input 206 and generates N outputs 108-1 to 108-N at the secondary side thereof, which are then rectified by corresponding synchronous rectifier-switches $S_{R1}$ to $S_{RN}$ (implemented using MOSFETs) with a closed-loop control for regulating the output currents $i_{o1}$ to $i_{oN}$ for powering LED groups 110-1 to 110-N. In these embodiments, the switches $S_1$ to $S_N$ are also implemented using MOSFETs. As will be described in more detail later, the output current to each LED group 110 is controlled at the secondary side of the transformer 204. The multi-output power circuit 102 may effectively provide optimal performance for each LED group 110. Since the current for each LED group 110 is individually controlled, any discrepancies and tolerances in LED groups 110 may be individually compensated.

Figure 6:
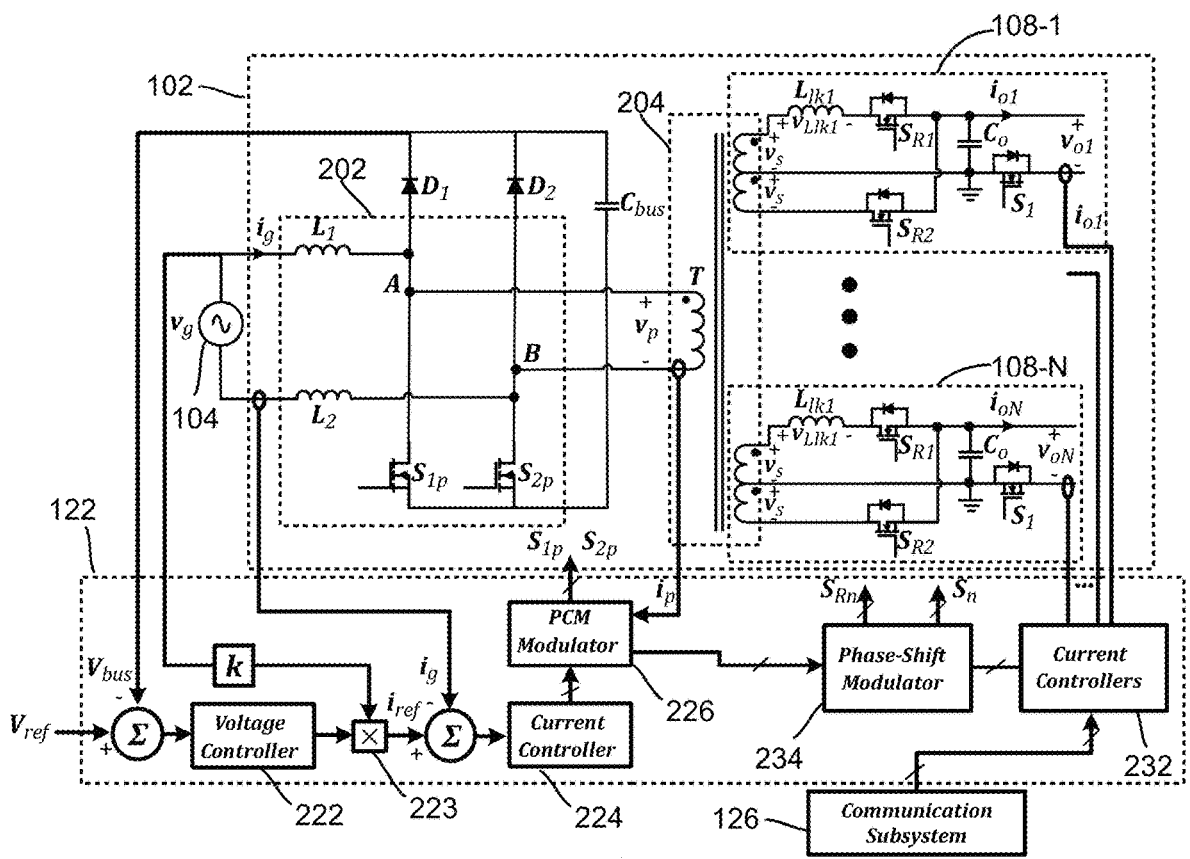
FIG. 6 is a block diagram showing a control subsystem of the LED light system shown in FIG. 3 for controlling the non-resonant multi-output power circuit shown in FIG. 5.

FIG. 6 is a block diagram showing a control subsystem 122 for controlling the non-resonant multi-output power circuit 102 of the LED light system 100. For ease of illustration, the output from the motion sensor 124 and the light-angle control are omitted in this figure.

As shown, the control subsystem 122 comprises a voltage controller 222, a multiplier 223, a current controller 224, and a pulse-code modulation (PCM) modulator 226 for controlling the switches $S_{1p}$ and $S_{2p}$ on the primary side of the transformer 204 to perform power-factor correction based on a reference voltage $V_{ref}$, the bus voltage $V_{bus}$, the output voltage $V_g$ of the power source 104, the output current $i_g$ of the power source 104, and the input current $i_p$ to the transformer 204. The controllers 222 and 224 may be implemented as respective control circuits.

The control subsystem 122 also comprises current controllers 232 (which may be implemented as control circuits) and a phase-shift modulator 234 for controlling the switches $S_{Rn}$ and $S_n$ (n=1, 2, . . . , N) on the secondary side of the transformer 204 based on the PCM of the PCM modulator 222, the output currents $i_{o1}$ to $i_{oN}$ of the DC outputs 108-1 to 108-N, and the output of the communication subsystem, for regulating the currents $i_{o1}$ to $i_{oN}$ flowing through the LED groups 110-1 to 110-N, and for providing a phase-shift between the high-frequency voltage waveforms at the primary side of the transformer 204 and at the secondary side of the transformer 204.

Figure 7:
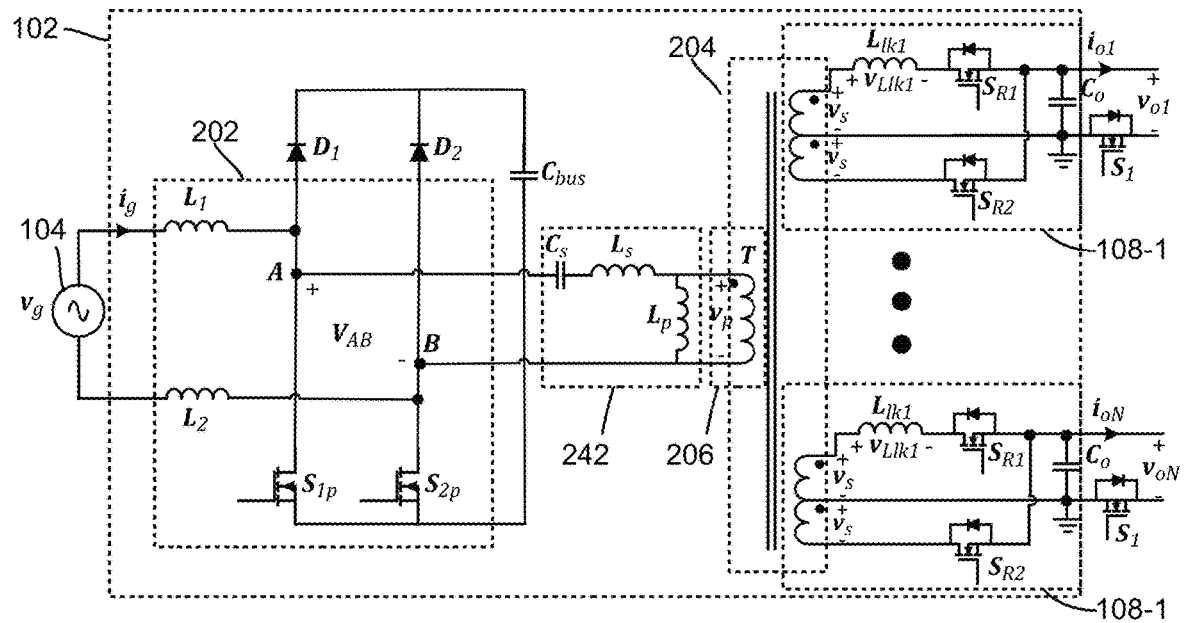
FIG. 7 is a circuit diagram showing the multi-output power circuit of the LED light system shown in FIG. 3 implemented using a resonant power circuit, according to some embodiments of this disclosure.

FIG. 7 is a circuit diagram showing the multi-output power circuit 102 implemented using a resonant power circuit in some embodiments. The multi-output power circuit 102 in these embodiments is similar to that shown in FIG. 5 except that the multi-output power circuit 102 in these embodiments further comprises a resonant circuit 242 at the primary side of the transformer 204.

The resonant circuit 242 in these embodiments is implemented using a capacitor $C_s$ and inductors $L_s$ and $L_p$, and supplies a high-frequency sinusoidal current for the high frequency transformer 204. The transformer 204 receives the high-frequency current at its input 206 and generates N outputs 108-1 to 108-N at the secondary side thereof which are then rectified by corresponding synchronous rectifier-switches $S_{R1}$ to $S_{RN}$ (implemented using MOSFETs) with a closed-loop control for regulating the output currents $i_{o1}$ to $i_{oN}$ for powering LED groups 110-1 to 110-N. The output current to each LED group 110 is controlled at the secondary side of the transformer 204. The multi-output power circuit 102 can effectively provide optimal performance for each LED group 110. Since the current for each LED group 110 is individually controlled, any discrepancies and tolerances in LED groups 110 may individually be compensated.

Figure 8:
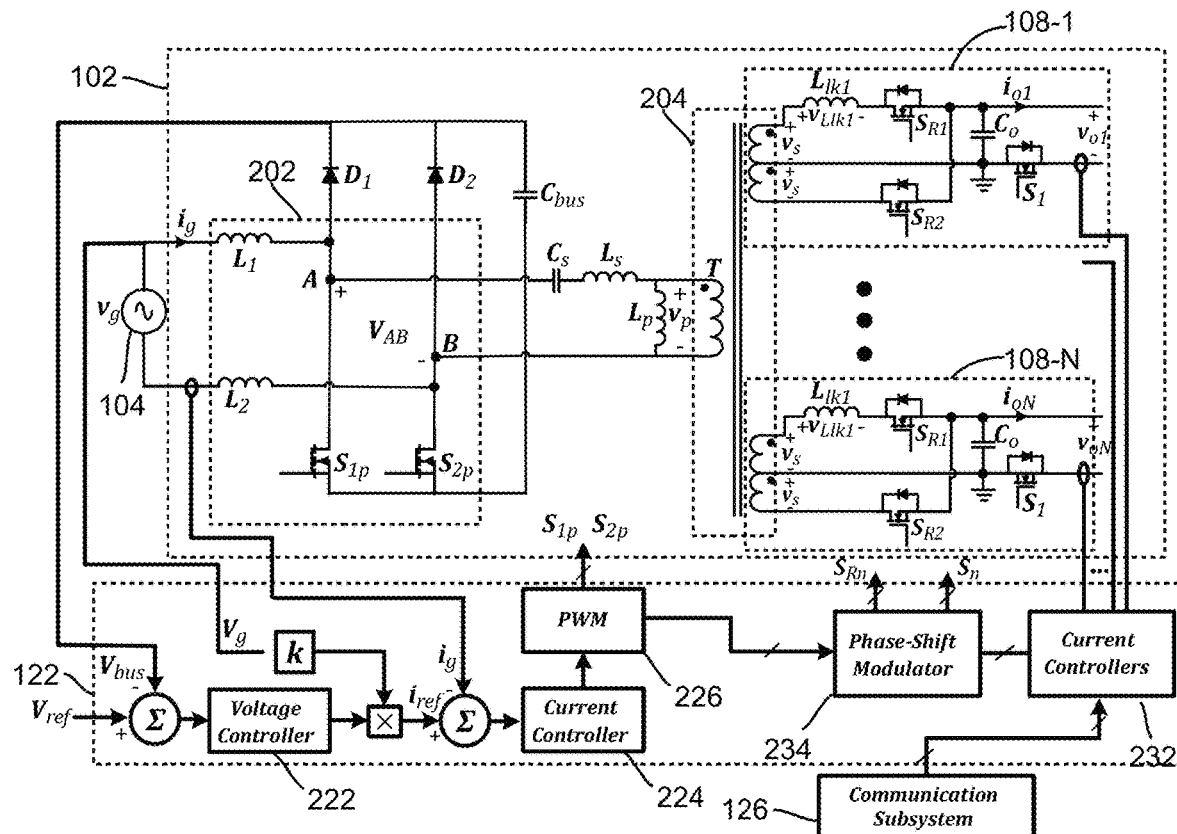
FIG. 8 is a block diagram showing a control subsystem of the LED light system shown in FIG. 3 for controlling the non-resonant multi-output power circuit showing FIG. 7.

As shown in FIG. 8, the control subsystem 122 shown in FIG. 6 may also be used for controlling the resonant multi-output power circuit 102 of the LED light system 100.

Figure 9:
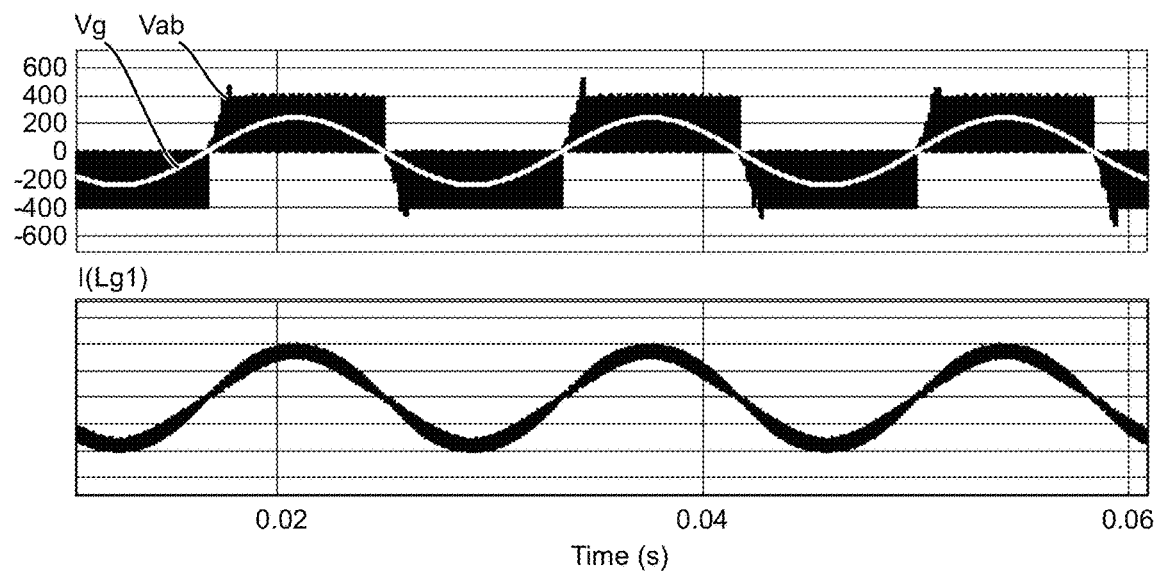
FIG. 9 shows the simulation results of the LED light system shown in FIG. 3.
Figure 10:
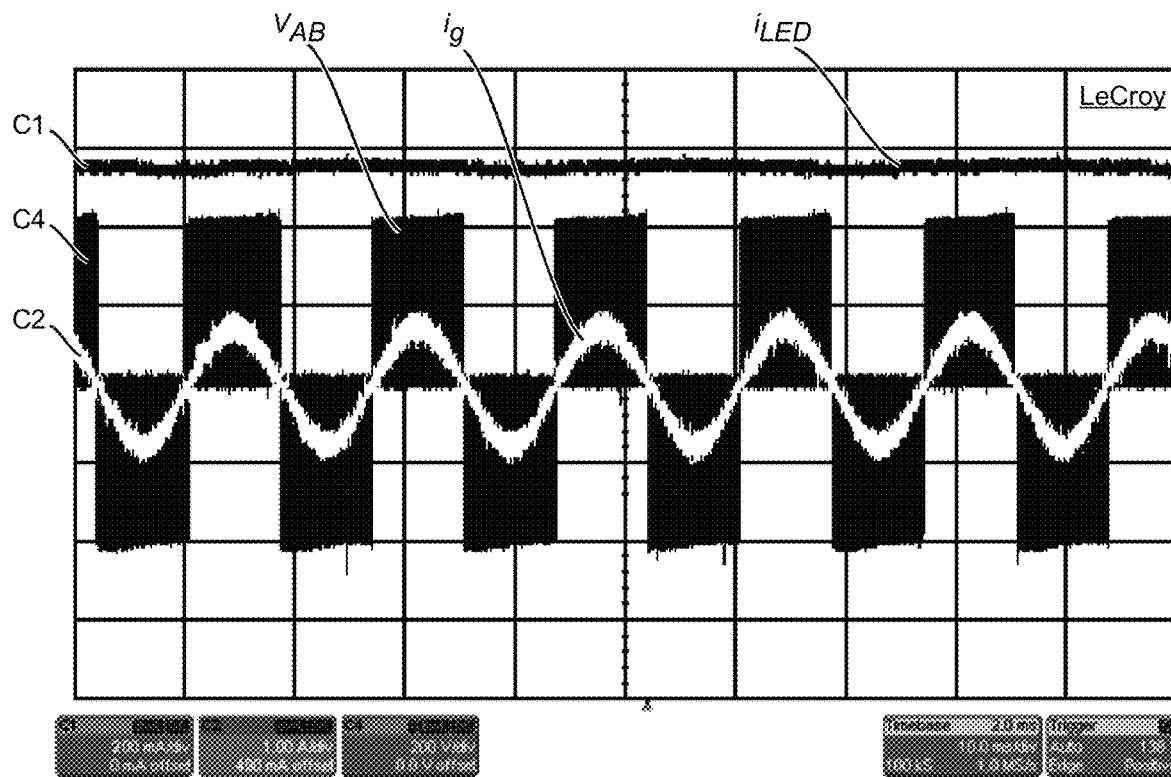
FIGS. 10 and 11 show the experimental results of the LED light system shown in FIG. 3.
Figure 11:
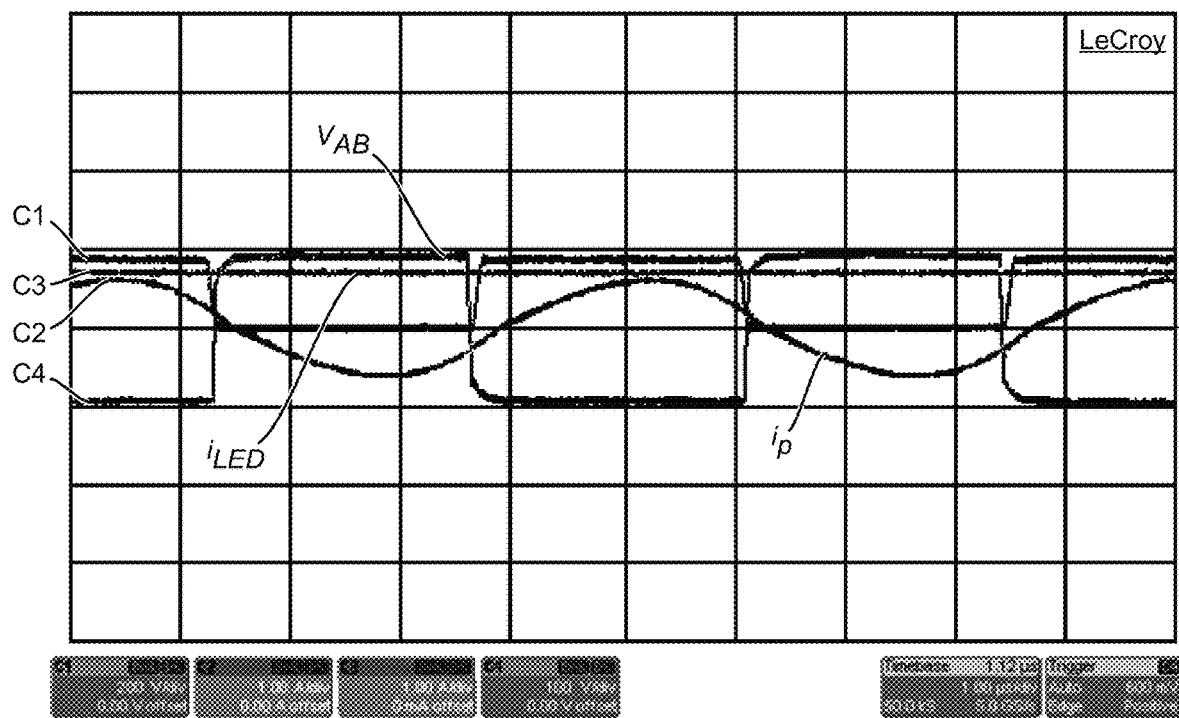

FIGS. 9 to 11 shown the simulation/experimental results of the LED light system 100 shown in FIG. 8 wherein FIGS. 9 and 10 are in the line frequency scale and FIG. 11 is in the switching frequency scale. The symbol "I(Lg1)" in FIG. 9 represents the current on L1 (see FIG. 8). The symbol $i_{LED}$ in FIGS. 10 and 11 represents the current flowing through the LEDs 106 of a randomly-selected LED group 110.

In above embodiments, the LED light system 100 comprises a motion sensor 124 for providing data to the control subsystem 122 for controlling the LEDs 106. In some alternative embodiments, the LED light system 100 may also comprise other suitable sensors such as one or more light sensors deployed at suitable locations (e.g., each adjacent a respective LED group 110) for providing data regarding the current ambient light level to the control subsystem 122 for controlling the LEDs 106 of each LED group 110.

Although the LED light system 100 in above embodiments comprises a motion sensor 124, in some alternative embodiments, the LED light system 100 may not comprise a motion sensor 124.

In some embodiments, the LED light system 100 may comprise a plurality of motion sensors 124 deployed at suitable locations (e.g., each adjacent a respective LED group 110) for detecting motions thereabout and providing motion-detection data to the control subsystem 122 for controlling the LEDs 106 of each LED group 110.

Although the LED light system 100 in above embodiments comprises a communication subsystem 126, in some alternative embodiments, the LED light system 100 may not comprise a communication subsystem 126.

Although in above embodiments, each LED group comprises a light-angle controlling structure 112 and a switch 114, in some embodiments, at least one LED group may not comprise a light-angle controlling structure 112. Yet in some embodiments, at least one LED group may not comprise a switch 114. Still in some embodiments, at least one LED group may not comprise a light-angle controlling structure 112 nor a switch 114.

Although embodiments have been described above with reference to the accompanying drawings, those of skill in the art will appreciate that variations and modifications may be made without departing from the scope thereof as defined by the appended claims.

What is claimed is:

1. A Light-Emitting Diode (LED) light system comprising:
    a plurality of LED groups connected in parallel, each of the plurality of LED groups comprising one or more LEDs;
    a power circuit comprising a plurality of outputs, each output electrically coupled to a corresponding one of the plurality of LED groups for powering the corresponding LED group; and
    a control subsystem electrically coupled to the power circuit for adaptively controlling operations of the plurality of LED groups;
    wherein at least a first one of the plurality of LED groups further comprises a light-angle controlling structure; and wherein the control subsystem is electrically coupled to the light-angle controlling structure for adjusting at least one of a light angle and a light angular-span of said at least the first one of the plurality of LED groups.

2. The LED light system of claim 1, wherein the control subsystem is configured for individually controlling each output of the power circuit for controlling the operation of the corresponding LED group coupled to said output for adapting to one or more characteristics thereof.

3. The LED light system of claim 1, wherein at least a second one of the plurality of LED groups further comprises a switch electrically coupled to the one or more LEDs of the second one of the plurality of LED groups in series; and wherein the control subsystem is electrically coupled to the switch for selectively enabling or disabling said at least the second first one of the plurality of LED groups.

4. The LED light system of claim 1, wherein said at least the first one of the plurality of LED groups further comprises a base structure controllable by the light-angle controlling structure thereof for rotating about one or more axes thereof for adjusting the light angle thereof.

5. The LED light system of claim 1, wherein said at least the first one of the plurality of LED groups further comprises one or more sub-platforms each comprising a subset of the one or more LEDs of the LED group; and wherein each of the one or more sub-platforms is controllable by the light-angle controlling structure thereof for rotating about one or more axes thereof for adjusting the light angular-span thereof.

6. The LED light system of claim 1, wherein at least one of the LEDs is rotatably coupled to a microelectromechanical-structure (MEMS) component thereby forming a LED assembly for adjusting the light angle thereof under the control of the MEMS component.

7. The LED light system of claim 6, wherein said at least the first one of the plurality of LED groups further comprises a base structure controllable by the light-angle controlling structure thereof for rotating about one or more axes thereof for adjusting the light angle thereof; and wherein the plurality of LED groups comprise a plurality of LED assemblies printed onto the base.

8. The LED light system of claim 1 further comprising:
at least one of a motion sensor and a light sensor; and
wherein the control subsystem is coupled to the at least one of the motion sensor and the light sensor for receiving sensor data therefrom for controlling the operation of the plurality of LED groups.

9. The LED light system of claim 1, wherein the power circuit comprises a transformer having an input on a primary side thereof for receiving electrical power and a plurality of outputs on a secondary side thereof for individually powering the plurality of LED groups.

10. The LED light system of claim 9, wherein the control subsystem comprises a voltage-control circuit, a first current-control circuit, and a pulse-code modulation (PCM) modulator for controlling a circuitry on the primary side of the transformer for power-factor correction.

11. The light system of claim 10, wherein the PCM modulator is configured for receiving the input current of the transformer and an output of the first current-control circuit for generating an output of the PCM modulator for controlling a PFC circuit on the primary side of the transformer.

12. The light system of claim 11, wherein the voltage-control circuit is configured for receiving a difference of a reference voltage and a bus voltage for outputting a signal for generating a reference current; and
wherein the first current-control circuit is configured for receiving a difference of the reference current and the output current of a power source for generating an output of first current-control circuit.

13. The LED light system of claim 9, wherein the control subsystem comprises a phase-shift modulator and a plurality of second current-control circuits for controlling a circuitry on the secondary side of the transformer for regulating currents of the plurality of LED groups.

14. The LED light system of claim 13, wherein the control subsystem is configured for controlling the circuitry on the secondary side of the transformer for regulating the currents of the plurality of LED groups based at least on an output of a pulse-code modulation modulator and output currents of the plurality of outputs on the secondary side of the transformer.

15. The LED light system of claim 14 further comprising:
a communication subsystem;
wherein the control subsystem is configured for controlling the circuitry on the secondary side of the transformer for regulating the currents of the plurality of LED groups based further on an output of the communication subsystem.

16. The LED light system of claim 13, wherein the control subsystem is further configured for providing a phase-shift between voltage waveforms at the primary side of the transformer and voltage waveforms at the secondary side thereof.

17. The LED light system of claim 9, wherein the control subsystem is configured for using a closed-loop control based on a plurality of parameters of the power circuit for individually controlling each output of the power circuit for adaptively controlling an operation of the corresponding LED group coupled to said output,
wherein the plurality of parameters comprise:
a reference voltage;
a bus voltage of a power-factor correction (PFC) circuit on the primary side of the transformer;
an output voltage of a power source to the power circuit;
an output current of the power source to the power circuit;
an input current of the transformer; and
currents of the plurality of outputs.

18. The LED light system of claim 1, wherein the control subsystem is configured for using a closed-loop control based on a plurality of parameters of the power circuit for individually controlling each output of the power circuit for adaptively controlling an operation of the corresponding LED group coupled to said output,
wherein the plurality of parameters comprise a plurality of voltage and current parameters of the power circuit; and
wherein the control subsystem is configured for using the closed-loop control based on the plurality of voltage and current parameters of the power circuit to regulate the current of each of the plurality of LED groups for individually controlling each output of the power circuit for adaptively controlling the operation of the corresponding LED group coupled to said output.

19. A method for controlling a plurality of Light-Emitting Diodes (LEDs) for lighting, the method comprising:
partitioning the plurality of LEDs into a plurality of LED groups connected in parallel, each of the plurality of LED groups comprising one or more of the plurality of LEDs connected in series;
powering each of the plurality of LED groups using a power circuit; and
adaptively controlling operations of the plurality of LED groups;
wherein said adaptively controlling the operations of the plurality of LED groups comprises:
adjusting at least one of a light angle and a light angular-span of at least a first one of the plurality of LED groups.

20. The method of claim 19, wherein said adaptively controlling the operations of the plurality of LED groups further comprises:
individually controlling the powering of each LED group for controlling the operation of the LED group for adapting to one or more characteristics thereof.

21. The method of claim 19, wherein said adaptively controlling the operations of the plurality of LED groups further comprises:
using a switch for selectively enabling or disabling at least a second of the plurality of LED groups.

22. The method of claim 19, wherein said at least the first one of the plurality of LED groups further comprises a base structure; and wherein said adjusting the at least one of the light angle and the light angular-span of the at least the first one of the plurality of LED groups comprises:

rotating the base structure about one or more axes thereof for adjusting the light angle thereof.

23. The method of claim 19, wherein said at least the first one of the plurality of LED groups further comprises one or more sub-platforms each comprising a subset of the LEDs of the LED group;
    wherein said at least the first one of the plurality of LED groups further comprises a base structure; and
    wherein said adjusting the at least one of the light angle and the light angular-span of the at least the first one of the plurality of LED groups comprises:
        rotating each of the one or more sub-platforms about one or more axes thereof for adjusting the light angular-span thereof.

24. The method of claim 19 further comprising:
    sensing at least one of motion and light about the plurality of LED groups; and
    controlling the operation of the plurality of LED groups based on said sensing.

25. The method of claim 19, wherein said adaptively controlling the operations of the plurality of LED groups comprises:
    using a transformer for receiving electrical power at a primary side thereof and individually powering the plurality of LED groups from a plurality of outputs on a secondary side thereof.

26. The method of claim 25, wherein said adaptively controlling the operations of the plurality of LED groups comprises:
    using a voltage-control circuit, a first current-control circuit, and a pulse-code modulation (PCM) modulator for controlling a circuitry on the primary side of the transformer for power-factor correction.

27. The method of claim 26, wherein said using the voltage-control circuit, the first current-control circuit, and the PCM modulator for controlling a portion of the power circuit for power-factor correction comprises:
    using the PCM modulator for receiving an input current of the transformer and an output of the first current-control circuit for generating an output of the PCM modulator for controlling a PFC circuit.

28. The method of claim 26, wherein said using the voltage-control circuit, the first current-control circuit, and the PCM modulator for controlling a portion of the power circuit for power-factor correction comprises:
    using the voltage-control circuit for receiving a difference of a reference voltage and a bus voltage for outputting a signal for generating a reference current; and
    using the first current-control circuit for receiving a difference of the reference current and the output current of a power source for generating a output of first current-control circuit.

29. The method of claim 25, wherein said adaptively controlling the operations of the plurality of LED groups comprises:
    using a phase-shift modulator and a plurality of second current-control circuits for controlling a circuitry on the secondary side of the transformer for regulating currents of the plurality of LED groups.

30. The method of claim 27, wherein said adaptively controlling the operations of the plurality of LED groups comprises:
    controlling the circuitry on the secondary side of the transformer for regulating the currents of the plurality of LED groups based at least on an output of the pulse-code modulation modulator and output currents of the plurality of outputs on the secondary side of the transformer.

31. The method of claim 30 further comprising:
    receiving and transmitting instructions via a communication subsystem for controlling the operation of the plurality of LED groups;
    wherein said individually controlling the powering of each LED group comprises:
        controlling the circuitry on the secondary side of the transformer for regulating the currents of the plurality of LED groups based further on an output of the communication subsystem.

32. The method of claim 27, wherein said adaptively controlling the operations of the plurality of LED groups comprises:
    providing a phase-shift between voltage waveforms at the primary side of the transformer and voltage waveforms at the secondary side thereof.

33. The method of claim 25, wherein said adaptively controlling the operations of the plurality of LED groups comprises using a closed-loop control based on a plurality of parameters of the power circuit for individually controlling the powering of each LED group, and
    wherein the plurality of parameters comprise:
        a reference voltage;
        a bus voltage of a PFC circuit of the power circuit on the primary side of the transformer;
        an output voltage of a power source to the power circuit;
        an output current of the power source to the power circuit;
        an input current of the transformer; and
        currents of the plurality of outputs.

34. The method of claim 19, wherein said adaptively controlling the operations of the plurality of LED groups comprises using a closed-loop control based on a plurality of parameters of the power circuit for individually controlling the powering of each LED group,
    wherein the plurality of parameters comprise a plurality of voltage and current parameters of the power circuit; and
    wherein said using the closed-loop control comprises:
        using a closed-loop control based on the plurality of voltage and current parameters of the power circuit to regulate the current of each of the plurality of LED groups for individually controlling the powering of the LED group for adaptively controlling an operation of the LED group.

\* \* \* \* \*